Patented Aug. 7, 1951

2,563,798

UNITED STATES PATENT OFFICE 2,563,798

METHOD OF TREATING RICE BRAN AND RICE POLISH

Harriet Louise Burns and Millard Mike Cassidy, Houston, Tex., assignors to American Rice Growers Cooperative Association, Lake Charles, La., a corporation of Louisiana No Drawing. Application June 7, 1949, Serial No. 97,715

7 Claims. (Cl. 99—153)

This invention is directed to a process for treating rice bran and rice polish, or a mixture thereof to preserve over a considerable period of time, the oils present in said rice bran and rice polish.

It is known that the oils in milled rice bran and rice polish, or a mixture of the two, develop fatty acids by oxidation and enzymatic action at an accelerated rate when compared to other oil-bearing materials when it remains in the bran for any period of time, thereby resulting in an oil of inferior quality.

An object of the invention therefore, is to treat the rice bran or rice polish in such manner as to retard the fatty acid development of the oils contained therein.

A further object of the invention is to stabilize the oil present in said rice bran or rice polish to permit storage of said rice bran or rice polish for a longer period of time than has been possible without changing the condition of the fatty acid content of the oil in said rice bran or rice polish.

An additional object is to preserve the oil present in rice bran and rice polish and to prevent oxidation and the setting up of enzymic action, during periods of storage of these materials or mixtures of them.

Other objects will appear hereinafter throughout the specification.

By the present process the fatty acid development of the oils present in rice bran or rice polish or a mixture of the two can be retarded for a reasonable period of time by bringing the temperature of the said bran or polish or mixture of the two to a minimum temperature of 212° F. under such conditions that the bran, polish or mixture of both will not be scorched or burned. By using this process, rice bran, polish or mixture of the two can be stored after it has been removed from the grain. After storage thereof for a reasonable time, from it can be extracted an oil of substantially lower fatty acid content and having a lower refining loss than can be extracted from untreated bran, polish or mixture of both of like kind, that is milled at the same time and stored under the same conditions and for the same period of time.

The invention in its broadest conception contemplates subjecting each particle of the rice bran and rice polish or mixtures of the two to a minimum temperature of 212° F. immediately or within a relatively short time interval after the bran and polish have been removed from the rice grain in order to retard the fatty acid development of the oils therein. In adoption of this broad concept commercially, the process is adaptable to more than one means of applying it without essential departure therefrom, depending upon the precise method and means adopted to accomplish a thorough penetration of heat at a minimum of 212° F. into the particles of rice bran and rice polish or mixtures of the two under such conditions that it will not be scorched or burned.

As an example of the application of this process, but not as a limitation of the same, we have employed live steam or radiant heat as the mediums of heat in the following manner:

Freshly milled rice bran or rice polish, or a mixture of the two, is accumulated in a hopper which is set to expel the material when it has accumulated a quantity of 50 pounds. The bran and polish or mixture of the two which is expelled from the hopper is emptied into a screw conveyor which empties into another screw conveyor in which the bran is treated. This conveyor in turn empties into a storage bin. The conveyor in which the bran is treated is 90 feet long, and, with the exception of the last 10 feet, the conveyor is insulated with 1½ inch asbestos in order to retain heat. The last 10 feet of the same conveyor is uninsulated to allow the hot material to cool somewhat before it is expelled from this conveyor into the storage bin. The first 20 feet of the conveyor is subjected to live steam at a pressure of substantially 100 pounds injected into this portion of the conveyor by perforated pipe in order to agitate the material passing through it and more nearly assure a thorough penetration of the heat.

The material passing through this section is subjected to a heat of approximately 212° F. for a time interval of 1.5 minutes, and the moisture content is raised by an additional 3 to 5%. This additional moisture prevents burning and scorching of the material in the succeeding 60 feet of the conveyor which is heated with both live steam at substantially 100 pound pressure and external radiant heat. The temperature inside this conveyor will vary, dependent upon the amount of radiant heat employed. In this particular process, we use steam companion lines on the outside of the conveyor and inside the insulation. The temperature in this section varies between 216° F. and 220° F. and the material being processed remains in this conveyor for about 3 minutes. The time element is important only from the aspect that the particles of material passing through the two sections of the conveyor must reach a minimum temperature of 212° F. The material then passes through an additional 10 feet of the conveyor which is uninsulated and equipped with a hood at its inception which pulls off a great majority of the steam vapors. This section of the conveyor cools the material somewhat before it is expelled into the storage bin.

From the above description, it will be apparent that other devices, machinery or equipment may be used without essential departure from this process.

Experiments made by us upon bran and polish treated in accordance with the present process and compared with untreated bran and polish of the same kind, character, and age which had been stored under the same conditions, produced the following comparative results:

Sample No. I and Sample II were from the same lot of rice bran obtained from rice which was milled at the same time, and stored under the same conditions for the same period of time. Sample No. I represents an untreated portion of this rice polish or bran and Sample No. II represents a portion of the same batch of material treated by the above described process.

| Period of Storage | Percentage of Free Fatty Acid |
|---|---|
| Sample No. I—Untreated | |
| 1 Week | 18 |
| 2 Weeks | 28 |
| 3 Weeks | 31 |
| 4 Weeks | 35 |
| Sample No. II—Treated | |
| 1 Week | 4 |
| 2 Weeks | 5 |
| 3 Weeks | 5 |
| 4 Weeks | 6 |

Numerous other tests have been made which yielded approximately the same comparative results. It is not claimed, however, that the exact comparative results above set out will always be obtained because of the difference which may exist in air, temperature, storage conditions, humidity and milling operations.

The minimum temperature to which the rice polish or rice bran has been subjected is indicated above as 212° F. The maximum temperature is dependent upon the amount of moisture absorbed by the bran from the steam in the first section of the conveyor. It will be understood that any temperature from 212° F. up is suitable as long as the bran does not scorch or burn, the temperature depending upon the moisture content, and also the methods used in obtaining the desired amount of heat. As much as 250° F. has been used with success in treating the rice bran and it is possible that higher temperatures may also be employed, depending, as stated above, upon the length of treatment, the amount of moisture in the material being treated and the amount of moisture in the air in contact with the material.

The length of time which the material is subjected to a temperature of 212° F. or higher, is entirely dependent upon the methods used in securing the desired temperature, and it has been found that any period of time in excess of that stated in the example given has no effect upon retarding fatty acid development of the oil in the material. As in the example, in a batch of bran with a normal moisture content treated at 250° F. for 20 minutes the fatty acid development is not retarded any more than when the material, from the same batch of material, is treated at lower temperatures for a shorter period of time. For this reason we ordinarily maintain a temperature in excess of 212° F. for such period of time to cause the rice bran or rice polish particles to be thoroughly penetrated by the minimum amount of heat.

The oil may be subsequently abstracted from the bran or polish by any of the well known methods.

From the above description of the present invention it is believed apparent that the same may be widely varied without essential departure from the spirit of the invention, and all such modifications and adaptations are contemplated as may fall within the scope of the appended claims.

We claim:

1. The method of treating material consisting of rice bran and/or rice polish to retard fatty acid development of the oils present in the material and to stabilize the oils therein comprising the steps of treating the material with live steam at a temperature of approximately 212° F. to heat and increase the moisture content thereof and thereafter further heating the material externally at a temperature in excess of 212° F. to insure thorough penetration of all of the particles of the material by a minimum temperature of 212° F., the overall minimum heating time to obtain said thorough penetration being about 4.5 minutes.

2. The method of treating material consisting of rice bran and/or rice polish to retard fatty acid development of the oils present in the material and to stabilize the oils therein comprising the steps of treating the material with live steam at a temperature of approximately 212° F. to heat and increase the moisture content thereof, immediately further heating the material externally at a temperature in excess of 212° F. to insure thorough penetration of all of the particles of the material by a minimum temperature of 212° F., the overall minimum heating time to obtain said thorough penetration being about 4.5 minutes, and thereafter partially cooling the material.

3. The method of treating material consisting of rice bran and/or rice polish to retard fatty acid development of the oils present in the material and to stabilize the oils therein comprising the steps of treating the material with live steam at a temperature of approximately 212° F. to heat and increase the moisture content thereof, immediately further heating the material with live steam and external radiant heat at a temperature in excess of 212° F. to insure thorough penetration of all of the particles of the material by a minimum temperature of 212° F., the overall minimum heating time to obtain said thorough penetration being about 4.5 minutes, and thereafter partially cooling the material.

4. The method of treating material consisting of rice bran and/or rice polish to retard fatty acid development of the oils present in the material and to stabilize the oils therein comprising the steps of treating the material with live steam at a temperature of approximately 212° F. to heat and increase the moisture content thereof from 3 to 5% and thereafter further heating the material externally at a temperature in excess of 212° F. to insure thorough penetration of all of the particles of the material by a minimum temperature of 212° F., the overall minimum heating time to obtain said thorough penetration being about 4.5 minutes.

5. The method of treating material consisting of rice bran and/or rice polish to retard fatty acid development of the oils present in the material and to stabilize the oils therein comprising the steps of treating the material with live steam at a temperature of approximately 212° F. for substantially 1.5 minutes to heat and increase the moisture content thereof and immediately thereafter heating the material externally at a temperature in excess of 212° F. for substantially 3 minutes to cause thorough penetration of all of the particles of the material by a temperature of 212° F.

6. The method of treating material consisting of rice bran and/or rice polish to retard fatty acid development of the oils present in the material and to stabilize the oils therein comprising the steps of agitating and heating the material substantially immediately following the removal of the material from the rice grain by subjecting the material to live steam at substantially 212° F. and 100 lbs. pressure for a time interval of about 1.5 minutes, further heating the material externally for substantially 3 minutes at a temperature in excess of 212° F. to insure thorough penetration of all of the particles of the material by a temperature of 212° F. and thereafter partially cooling the material.

7. The method of treating material consisting of at least one of the products rice bran and rice polish to retard fatty acid development of the oils present in the material and to stabilize said oils therein before storage of the material comprising the steps of conveying said material to a first section of a conveyor substantially immediately upon its removal from the grain, subjecting the material in said first section to live steam at substantially 212° F. to agitate the material, to heat the material and to increase the moisture content of the material from 3 to 5%, conveying said material to a second section of said conveyor, heating said material in said second section simultaneously with live steam and external radiant heat at a minimum temperature of 212° F. for a length of time sufficient to cause thorough penetration of all the particles of the material with the said minimum amount of heat and conveying said material to a third section of said conveyor for the purpose of partially cooling said material before storage of the material, the overall minimum heating time necessary to obtain thorough penetration being about 4.5 minutes.

HARRIET LOUISE BURNS.
MILLARD MIKE CASSIDY.

REFERENCES CITED

The following references are of record in the file of this patent:

UNITED STATES PATENTS

| Number | Name | Date |
| --- | --- | --- |
| 1,423,830 | Christensen | July 25, 1922 |
| 1,662,401 | Sasseen | Mar. 13, 1928 |
| 1,850,123 | Anderson | Mar. 25, 1932 |